United States Patent [19]

Kai et al.

[11] 4,189,639
[45] Feb. 19, 1980

[54] PROCESS FOR ANALYZING CHARGED PARTICLES

[75] Inventors: Yoshiaki Kai, Moriguchi; Wataru Sakurai, Hirakata; Fumiya Konishi, Toyonaka, all of Japan

[73] Assignee: Matsushita Electric Industrial Co., Ltd., Osaka, Japan

[21] Appl. No.: 878,875

[22] Filed: Feb. 17, 1978

[30] Foreign Application Priority Data

Feb. 21, 1977 [JP] Japan ................... 52-18531

[51] Int. Cl.² .................. D01D 59/44; H01J 39/34
[52] U.S. Cl. ............................... 250/282; 250/284
[58] Field of Search ............ 250/281, 282, 284, 288, 250/299, 398, 492

[56] References Cited

U.S. PATENT DOCUMENTS 3,510,646  5/1970  Briggs et al. .................. 250/281

OTHER PUBLICATIONS

"Analysis of Semiconductor Surfaces by Spark Source Mass Spectrometry," Clegg et al., ACTA Elect. 18, 1, 1975, pp. 27–32.
"Review of Recent Advances in the Applications of Spark Source Mass Spectrometry," Bingham et al., Lab. Practice, Apr. 1975, pp. 233–238.
"Secondary Ion Mass Spectrometry and It's Application to Thin Film and Surface Analysis," Werner, ACTA Elect., 18, 1, 1975, pp. 51–62.

*Primary Examiner*—Bruce C. Anderson
*Attorney, Agent, or Firm*—Burgess, Ryan and Wayne

[57] ABSTRACT

A process for analyzing charged particles wherein charged particles are impinged on a film of resist which is made of polymethylmethacrylate sensitive to charged particles, the resist film is dissolved and the mass of charged particles impinged is measured in terms of the dissolved resist or the resist left.

10 Claims, 8 Drawing Figures

(a)    (b) PRIOR ART

PROCESS FOR ANALYZING CHARGED PARTICLES

BACKGROUND OF THE INVENTION

The present invention relates to a process for analyzing charged particles and more particularly a process for analyzing a sample with a resist which is sensitive to charged particles.

In general, in order to determine the masses of atoms or molecules found in a sample of gas, liquid or solid, a mass spectrometer and a mass spectrograph have been used. With a mass spectrometer, an analysis cannot be completed within a short time because of the unsteady nature of an ion beam. That is, the output current for a specific isotope from an electron multiplier of the mass spectrometer must be integrated for a predetermined time interval so that a correct mass may be determined. As a result, much time and labor are required for assaying a large number of ions found in a sample. Furthermore result attainable with a mass spectrometer is almost equal to result attainable by a mass spectrograph.

A mass spectrograph is advantageous in various respects over a mass spectrometer. First, all of atoms found in a very small quantity of a sample may be simultaneously analyzed with a higher degree of resolution, a more definite relation between mass and position in a mass spectrum and a high S/N ratio. Secondly, interference lines due to the presence of hydrocarbons and multiple charge ions may be clearly separated from peak lines. Thirdly, a wide mass spectrum may be obtained.

With a mass spectrograph, a specific isotope is in general exposed several times at different exposure levels in order to obtain a peak line of this isotope. However, there is not available a photographic emulsion capable of making equal records of all of the charged particles, and a photographic plate cannot be adjusted so as to be sensitive particularly to a selected charged particle.

In order to assay a mass spectrum obtained with a mass spectrograph, a microphotometer is used to measure blackness or the area of a peak line, but various errors result. When an extremely fine parallel light beam is impinged on a negative, some is specularly transmitted and some is scattered by a vast number of silver particles in an emulsion layer. Blackness measured in terms of all the transmitted light is referred to as diffused blackness while blackness measured in terms of only the light passing directly through the negative is referred to as specular blackness. However specular blackness is not absolutely correct because the microphotometer also picks up light reflected from the negative. Diffused blackness is also inaccurate because the microphotometer picks up light transmitted laterally of the negative. That is, the blackness measured varies depending upon an illumination system and an optical measurement system of the microphotometer so that the analytical results in terms of blackness also vary.

SUMMARY OF THE INVENTION

In view of the above, one of the objects of the present invention is to provide a novel process for analyzing charged particles with a higher degree of accuracy and reproducibility without being adversely affected by environmental conditions.

To the above and other ends, the present invention employs, instead of photographic plates, a charged particle assaying plate having a film of a resist which is sensitive to charged particles.

DESCRIPTION OF THE PREFERRED EMBODIMENT

Prior Art, FIGS. 1–4

Figure 1:
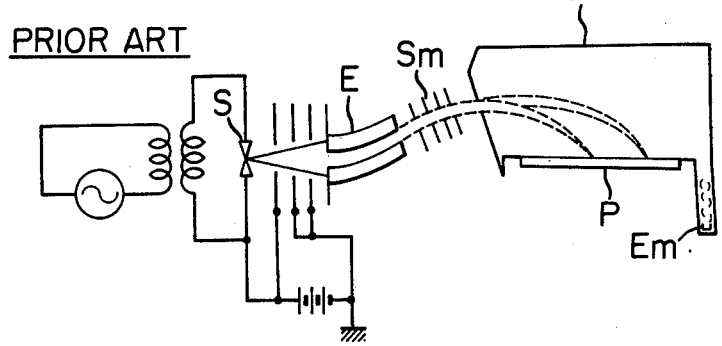
FIG. 1 is a schematic view of a double-focusing mass spectrograph which may also serve as a mass spectrometer.
Figure 2:
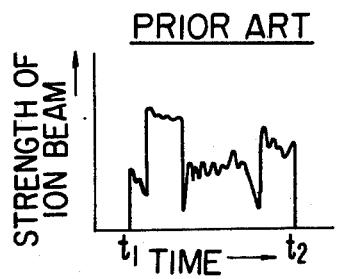
FIG. 2 shows the variation in intensity of an ion beam from a source consisting of a pair of electric spark electrodes.

Prior to the description of the preferred embodiment of the present invention, a prior art mass spectroscope will be described with reference to FIGS. 1–4. FIG. 1 shows a most typical double-focusing mass spectroscope or spectrograph including a pair of electrodes S made of a sample to be assayed, a fan-shaped staticelectric field E, a monitor slit Sm, a magnetic field M, a photographic plate P upon which fall ions, and an electron multiplier Em so that this arrangement may be also used as a mass spectrometer wherein the ions passing through the slit Sm are detected by the electron multiplier Em. In general, the electric sparks are used as sources of ions in solid analyses. However because of unsteady nature of the spark, the ion beam intensity varies in time as shown in FIG. 2 so that the correct analyses cannot be made based on the mass spectrum obtained during a short assaying time. Therefore in order to effect more definite analyses by sweeping the magnetic field, the acceleration voltage and the electric field, the output current from the electron multiplier for each isotope under a predetermined exposure must be integrated from $t_1$ to $t_2$ in FIG. 2. Therefore much labor and time are required for analyses of many ions, and the degree of reproducibility obtainable is nearly equal to the reproducibility obtained by a mass spectrograph (the relative standard deviation C.V. 5 to 30%).

Meanwhile a mass spectrograph is advantageous over a mass spectrometer in (1) that all of ions included in a sample in an extremely small quantity may be simultaneously analyzed with a higher degree of resolution, (2) that a high S/N ratio may be obtained, (3) that the interference lines due to the existence of hydrocarbons, multiple charge positive ions and so on may be clearly observed so that a wide mass spectrum may be obtained and high resolution may be attained, (while the resolution with a mass spectrometer is of the order of 600, the resolution with a mass spectrograph is between 2,000 and 3,000) and (4) that the mass spectrum may be recorded for a long time.

Figure 3:
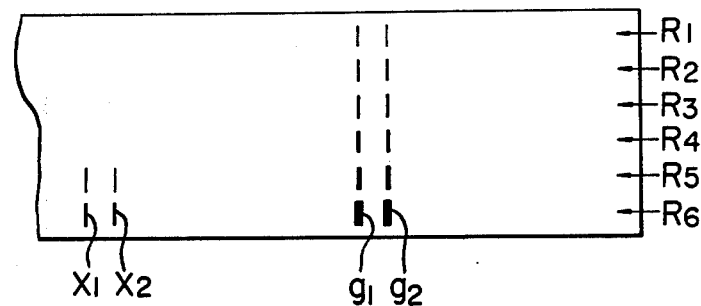
FIG. 3 is a mass spectrum obtained by multiple exposures with a mass spectrograph.

Therefore in general a mass spectrograph is preferred to a mass spectrometer for quantitative and qualitative analyses. FIG. 3 shows a mass spectrum obtained with a mass spectrograph. $g_1$ and $g_2$ indicate isotopes of a major component G of a sample while $x_1$ and $x_2$ indicate isotopes of an impurity X contained in the sample. $R_n$ (n=1, 2, 3, 4, 5 and 6) indicates a spectral number, and $R_6$ indicates a spectral line recorded at a maximum exposure while $R_1$, a spectral line recorded at a minimum exposure. That is, each isotope is recorded at six-step exposure levels. For instance, in order to obtain higher resolution and a more definite relation between mass and position of an impurity ion in a spectrum, the exposure $R_5$ or $R_6$ is used. However there has not been available a photographic plate which is equally responsive to any charged particles.

Figure 4:
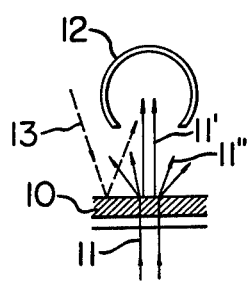
FIG. 4(a) shows the measurement of specular blackness.
FIG. 4(b) shows the measurement of diffused blackness.
Figure 4:
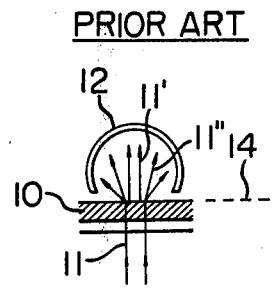

In order to effect quantitative analyses with a mass spectrograph, masses of ions are analyzed in terms of the ratio in area between peak line profiles by measuring the blackness of each peak line with a microphotometer. However, optical measurements of photographic plates with a microphotometer result in various errors. A large number of silver particles are dispersed within an emulsion layer 10 so that when an extremely fine parallel light beam is made incident perpendicular to a photographic plate as shown in FIG. 4, some 11' is specularly transmitted and some 11" is scattered in all directions by the silver particles. When blackness is measured with a photometer 12 which intercepts only the light passing directly through the photographic plate or the negative as shown in FIG. 4(a), blackness is specular while blackness is measured by the photometer 12 which intercepts all the transmitted light, blackness is diffused. However in the specular blackness measurement, the photometer 12 picks light 13 in the atmosphere as shown in FIG. 4(a) while in the diffused blackness measurement, light 14 transmitted transversely of the emulsion 10 is also picked up by the photometer 12. Thus blackness varies depending upon an illumination system of a photometer (for instance, an area illuminated) and a measuring system (for instance, a projection lens, a scan slit and so on). Thus the quantitative analyses in terms of the blackness is not accurate.

Figure 6:
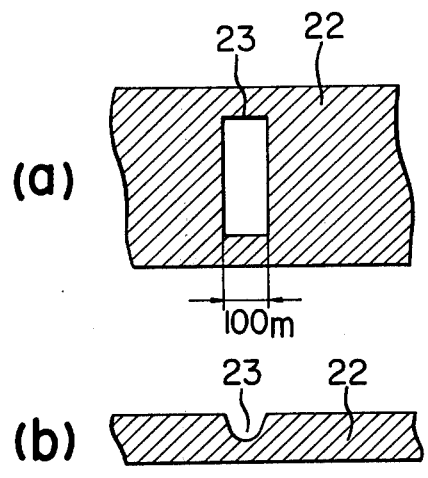
FIG. 6(a) is a top view, on enlarged scale, of the assaying plate illustrating a recess left in a resist film after development.
FIG. 6(b) is a vertical sectional view thereof.
Figure 5:
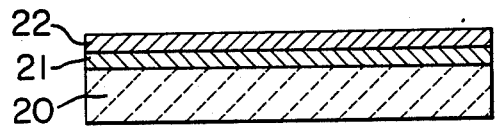
FIG. 5 is a sectional view of an assaying plate used in the present invention.

The Invention, FIGS. 5 and 6

According to the present invention, an assaying plate shown in FIG. 5 is used. The assaying plate consists of a flat glass plate 20, an electrically conductive film 21 of for instance $SnO_2$ coated on one major surface of the glass plate 20 and a charged particle sensitive positive type resist film 22 of, for instance, polymethylmethacrylate coated over the major surface of the conductive film 21. When electrons or other charged particles such as ions strike against the resist film 22, depolymerization occurs. That is, the degree of polymerization in an area upon which charged particles have fallen is in correct proportion to the number of charged particles or ions present and the molecular weight of this area is reduced. The assaying plate is developed; that is, the depolymerized area in the resist film 22 is dissolved with a solvent. The quantity of the dissolved polymethylmethacrylate is in correct proportion to the number of ions present so that a recess 23 is formed as shown in FIG. 6. That is, the recess 23 indicates the area where the charged particles have fallen.

The conductive film 21 is provided in order to avoid the adverse effects (charge-up) due to the collision of the charged particles with the surface charges.

In the outer space where a vast number of charged particles and electrons are present, the weight of the dissolved resist is measured. That is, the difference in weight of the assaying plate prior to and after the development is obtained, whereby the total mass of ions present may be obtained. When a number of ions is less, the dissolved resist may be measured with a gas mass spectrometer or a gas chromatography, whereby the total mass of ions present may be obtained. In case of electrons, because of the easy penetration of electrons into the resist film, the depth of the recess 23 is in the range of thousands of angstroms (Å) to one micron.

The volume of the recess 23 left in the resist film 22 after the development is also in correct proportion with the mass of specific ions which have fallen in this portion. Therefore the total mass of ions present may be measured in terms of the volume of the recess 23 which may be measured with a depth meter.

In practice, instead of the photographic plate shown in FIG. 1, the assaying plate shown in FIG. 5 is placed in the instrument shown in FIG. 1. For instance ions from a sample containing silver and copper are accelerated at an acceleration voltage of 16 KV and are made to impinge against the resist film 22. Then a mass spectrum similar to that shown in FIG. 3 is obtained, and by the measurement of the quantities of the dissolved resist, the total masses of silver and copper ions may be measured.

Next the process for measuring the mass of silver ions will be described. Since the silver ions are by far greater than the electrons, the penetration is less, but a plurality of peak lines may be obtained. After the development, the recesses 23 are obtained as described above. With the instrument shown in FIG. 1, the slit is so arranged that the peak lines are all same in length. Therefore the cross sectional area of the recess, which may be measured with a depth meter, is in proportion to the product of the exposure which may be measured with the monitor slit Sm, the relative isotope abundance and the concentration of silver ions. For instance, a mass spectrum of silver was obtained by the exposure ranging from $10^{-5}$ coulombs/$cm^2$ to $10^{-7}$ coulombs/$cm^2$.

According to the present invention, all of the elements in a sample may be analyzed, and the sensitivity of the resist film may be suitably varied by changing the degree of polymerization of polymethylmethacrylate.

In addition to the polymethylmethacrylate charged particle responsive compound, various high molecular compounds may be used. They are for instance polybutylmethacrylate, methylmethacrylatemethacrylicacid copolymer, methylmethacrylateacrylonitrile copolymer, methylmethacrylate-isobutylene copolymer, polybutene-1-sulfone, polystyrenesulfone, polymethylisopropenylketone, polymethacrylamide, α-cyanoacrylate-α-carbamoylacrylate copolymer, methylmethacrylate-α-chloromethylacrylate copolymer and so on. Furthermore they may be so combined as to obtain a suitable sensitivity. These charged particle sensitive compounds are of the positive resist type, but it will be understood that negative resist type compounds may be equally employed. With a negative resist type assaying plate, the quantity of the resist film left after the development may be measured. Alternately, the cross sectional area of the left resist film may be measured.

As described above, the charged particle assaying process in accordance with the present invention may entirely eliminate errors caused when a microphotometer is used for the measurement of blackness of peak lines in a mass spectrum recorded on a photographic plate. The precise analyses may be easily made by the measurement of the dissolved resist or the cross sectional area of a recess left in the resist layer after the development. Therefore high reproducibility may be ensured. Furthermore the sensitivity of the resist film may be adjusted depending upon the elements of a sample to be assayed. Moreover a resist film which is not sensitive to visible light may be prepared and used so that a dark room may be eliminated and the analyses may be much facilitated.

What is claimed is:

1. A process for analyzing the mass of charged particles characterized by coating over a flat substrate a positive resist film which is sensitive to charged particles, causing the charged particles to impinge against said charged particle sensitive film, dissolving the charged particle sensitive resist in a portion impinged with said charged particles, and determining the quantity of resist impacted by said particles by measuring the quantity of dissolved particle sensitive resist or the quantity of undissolved particle sensitive resist, thereby quantitatively analyzing the charged particles in terms of the quantity of the dissolved charged particle sensitive resist.

2. A process for analyzing charged particles as set forth in claim 1 wherein said charged particle sensitive resist film is coated over an electrically conductive film which in turn is coated over said flat substrate.

3. A process for analyzing charged particles characterized by coating over one major surface of a flat substrate of a film of a positive resist which is sensitive to charged particles, causing charged particles to impinge over said charged particle sensitive resist film to obtain a mass spectrum, dissolving the charged particle sensitive resist in portions corresponding to peak lines, thereby forming recesses, and analyzing the mass of charged particles present in each recess by measuring the cross sectional area of said recess.

4. A process as set forth in claim 2 wherein said charged particle sensitive resist film is coated over an electrically conductive film which in turn is coated over said flat substrate.

5. A process for analyzing the mass of charged particles characterized by coating over a major surface of a flat substrate a film of charged particle sensitive negative resist, causing the charged particles to impinge upon said negative resist film, dissolving the negative resist in a portion which is impinged with the charged particles, and determining the quantity of resist impacted by said particles by measuring the quantity of dissolved particle sensitive resist or the quantity of undissolved particle sensitive resist, and analyzing the charged particles in said portion in terms of the negative resist left.

6. A process for analyzing charged particles as set forth in claim 5 wherein said negative resist film is coated over an electrically conductive film which in turn is coated over a major surface of said flat substrate.

7. A process for analyzing charged particles characterized by coating over a major surface of a flat substrate a film of resist which is negatively sensitive to charged particles, causing charged particles to impinge over said negative resist film, thereby obtaining a mass spectrum, dissolving the negative resist in the portions except the portions corresponding to the peak lines, and analyzing the charged particles in terms of the cross sectional area of the portions left in said negative resist film.

8. A process for analyzing charged particles as set forth in claim 7 wherein said negative resist film is coated over an electrically conductive film which in turn is coated over a major surface of said flat substrate.

9. The process according to claims 1, 3 or 5, wherein said film comprises a polymer which is susceptible to depolymerization by said charged particles.

10. The process according to claim 9, wherein said film comprises polymethylmethacrylate, polybutylmethacrylate, methylmethacrylatemethacrylicacid copolymer, methylmethacrylateacrylonitrile copolymer, methylmethacrylate-isobutylene copolymer, polybutene-1-sulfone, polystyrenesulfone, polymethylisopropenylketone, polymethacrylamide, α-cyanoacrylate-α-carbamoylacrylate copolymer, or methylmethacrylate-α-chloromethylacrylate copolymer.

* * * * *